(No Model.) 2 Sheets—Sheet 2.

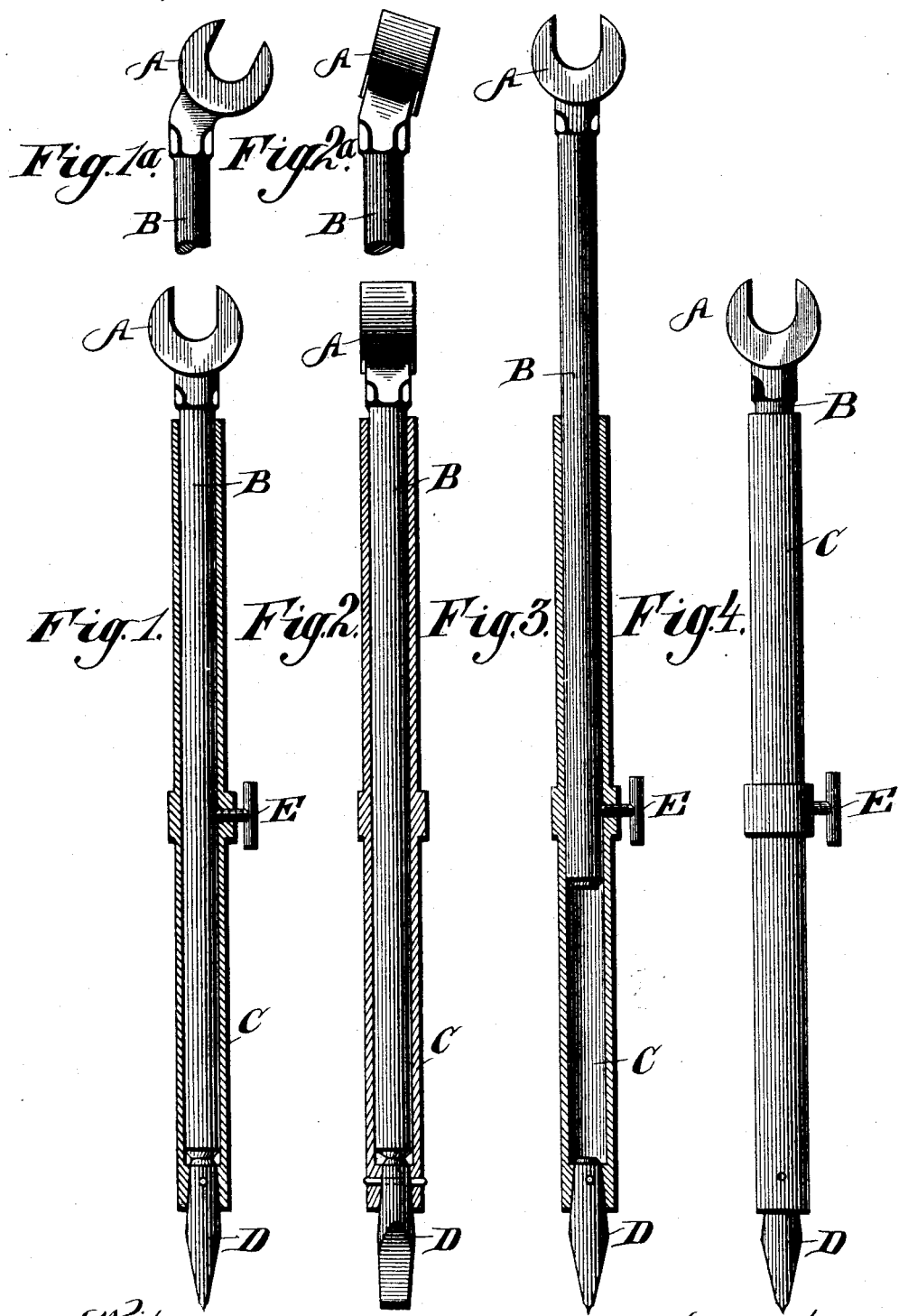

G. MASSEY.
COMBINATION TOOL.

No. 510,981. Patented Dec. 19, 1893.

Witnesses:
H. G. Dieterich
M. J. L. Higgins

Inventor
George Massey
By Henry Ott Atty.

UNITED STATES PATENT OFFICE.

GEORGE MASSEY, OF SYDNEY, NEW SOUTH WALES.

COMBINATION-TOOL.

SPECIFICATION forming part of Letters Patent No. 510,981, dated December 19, 1893.

Application filed August 12, 1893. Serial No. 482,979. (No model.)

*To all whom it may concern:*

Be it known that I, GEORGE MASSEY, consulting engineer, a subject of the Queen of Great Britain, residing at Sydney, in the British Colony of New South Wales, have invented a new and useful Improved Combination Spanner and Locking-Tool for Nuts and Bolts, of which the following is a specification.

This invention which is specially suitable for operating upon "fish" nuts and bolts—that is—the nuts and bolts used for securing the ends of railway metals or bars together and for which purpose it has been more especially devised—consists of a spanner having a shank or handle of convenient length onto which loosely fits a tubular sleeve into one end of which sleeve there is secured a short chisel bit by which the nuts after having been screwed up by the spanner end may be quickly and effectually locked upon their respective bolts by slightly upsetting the thread by making a cut or indent upon the thread of the bolt close up to the nut with the chisel bit in the end of the tubular sleeve and which nuts although thereby securely locked thereon may be again further screwed up and relocked or they may be removed entirely and again placed into position upon the bolts and relocked all of which operations may be quickly and easily carried out without in any way materially injuring or destroying any part whatever of the nut and bolt.

It is well known that there have been very many inventions relating to the locking of nuts and bolts which have consisted either of some specially constructed nut or some specially constructed bolt, or both, or to some specially constructed washer, &c., and to make use of such inventions for "fishing" rail ends means either removing the ordinary nut and bolt or adding some other part or parts to effect the locking and owing to the great cost of making such alterations in a railway system of any magnitude very few if any have been extensively used.

A lock nut and bolt to be suitable for securing fish plates to rail ends should fulfill certain conditions of which the following may be considered as some of the most important—that is—that the weight of the nut and bolt complete with the locking device must not be in excess of the ordinary nut and bolt; neither must the cost of manufacturing them be increased; that the time taken up by a man putting them into position properly screwing them "home" and locking same must not exceed that previously necessary; that although effectually locked the nut may be either quickly removed altogether or further tightened and again locked without destroying any part; that the number of parts should not exceed two—that is—the nut and bolt; that there shall not require any alterations to the fish plates or to the rails, or to the bolt holes therein; that the strength and the durability shall not be less than that of the ordinary nut and bolt. Even should it be practicable to produce a nut and bolt which would fulfill the foregoing conditions yet to bring them into use in a railway system already laid down it would be necessary to remove the nuts and bolts now fixed in the rail ends in order to admit of the improved one being substituted therefor which would mean sacrificing a great portion of the capital already expended thereon, and also the laying out of further capital in the purchase of the improved and also in the cost of putting same into position. It is with a view of overcoming all these difficult conditions that I have invented my apparatus by which not only can the ordinary nuts and bolts be put into position in the fish plates and tightened up and locked, but also the nuts and bolts already in use in the permanent way may be equally so tightened up and locked and this latter is of the very greatest importance.

In order that my invention may be clearly understood reference will now be made to the drawings herewith in which—

Figures 1, 2 and 3 are sectional elevations of my improved apparatus. Figs. 1ª and 2ª are detached side and edge views of a portion of the spanner and its rod illustrating the spanner arranged at an angle to its rod. Figs. 4, 5, 6 and 7 are elevations of the apparatus, Fig. 5 illustrating the spanner rod drawn partly out of its holder, Fig. 6, its application to a nut, and Fig. 7 the application of the chisel bit to a bolt in upsetting the thread thereof.

In the above figures of drawings, A is a spanner with a shank or handle B. of any convenient length.

C. is a tubular sleeve loosely fitting the shank or handle B.

D. is a short chisel bit secured into the one end of the tubular sleeve C.

E. is a clamping bolt screwed through the tubular sleeve C.

It will be noticed that in Figs. 1 and 2 the shank of the spanner is shown resting upon the chisel bit, while in Fig. 3 it has been raised.

Figs. 6 and 7 illustrate the mode of using the apparatus on fish nuts and bolts in which Fig. 6 shows the spanner end upon the nut in such a position in which it would be when either taking the nut off or tightening it up, and during which the clamping bolt E. would be preferably screwed up to prevent the tubular sleeve C. from moving up or down the shank or handle B. When the nut has been screwed "home" the apparatus will be turned end for end and the chisel bit placed upon the end of the bolt close up to the face of the nut as illustrated by Fig. 7. When the clamping bolt E. having been slackened the spanner together with its shank or handle B. is drawn any required distance from the tubular sleeve C. and then thrust downward when the lower end of the shank will strike the upper end of the chisel bit which has the effect of slightly "upsetting" the thread of the bolt and thereby securely locking the nut thereon.

The chisel bit D. in the end of the tubular sleeve C. I have illustrated as shaped at the end like an ordinary fitter's chisel which I deem the most desirable, but this may be modified as may also be the manner of securing the chisel bit into the tubular sleeve as for instance instead of it being put in taper and a small pin through it as illustrated it may be secured by being screwed in, or it may be secured by a small set screw bolt tapped through the tubular sleeve either of which modifications may be adopted without in any way departing from the nature of the invention; as may also the spanner end be set out of the straight as shown in Figs. 1ª and 2ª.

The upper end of the chisel bit and also the end of the shank will be preferably hardened and tempered to prevent the burring of the same.

I would have it distinctly understood that I am well aware that there is not any novelty in the locking of nuts upon bolts by slightly upsetting the thread as this is common practice with such as builders of carriages, buggies, and other similar vehicles, who usually effect it by means of an ordinary hammer and chisel, but it is impracticable for a plate layer or fetler to carry about with him an ordinary hammer and chisel in addition to the ordinary spanner when working upon a railroad.

Having thus particularly described and ascertained the nature of this invention and in what manner the same is to be performed, I claim—

1. A combined spanner and locking tool comprising a bit and an extensible spanner adapted to impact upon the bit, for the purpose set forth.

2. A combined spanner and locking tool comprising a tubular bit stock a bit in one end thereof, and a spanner provided with a shank fitting said stock and adapted to impact upon the bit, for the purpose set forth.

3. A combination spanner and locking tool, comprising a tubular bit stock, a bit in one end thereof, a spanner provided with a shank fitting said stock and adapted to impact upon the bit, and a locking device for locking the spanner shank against motion in the stock, for the purpose set forth.

Dated this 10th day of July, 1893.

GEORGE MASSEY.

Witnesses:
FRED WALSH,
 *Fel. Aust. Inst. P. A., Sydney.*
THOMAS JAMES WARD.